(12) United States Patent  
Yasuno et al.

(10) Patent No.: US 9,423,884 B2
(45) Date of Patent: Aug. 23, 2016

(54) KVM SWITCH AND KVM SYSTEM

(71) Applicant: FUJITSU COMPONENT LIMITED, Tokyo (JP)

(72) Inventors: Kazuhiro Yasuno, Tokyo (JP); Masato Hirose, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/022,913

(22) Filed: Sep. 10, 2013

(65) Prior Publication Data

US 2014/0075062 A1 Mar. 13, 2014

(30) Foreign Application Priority Data

Sep. 12, 2012 (JP) ................................. 2012-200861

(51) Int. Cl.
*G06F 3/00* (2006.01)
*G06F 13/12* (2006.01)
*G06F 13/00* (2006.01)
*G06F 3/023* (2006.01)

(52) U.S. Cl.
CPC ...................................... *G06F 3/023* (2013.01)

(58) Field of Classification Search
CPC ..... G06F 3/023; G06F 13/14; G06F 13/4022; G09G 2370/24
USPC ............................................. 710/38, 62, 316
See application file for complete search history.

(56) References Cited

U.S. PATENT DOCUMENTS

| 6,557,170 B1* | 4/2003 | Wilder et al. ................. 725/130 |
| 6,567,869 B2* | 5/2003 | Shirley ............................ 710/62 |
| 7,584,309 B2* | 9/2009 | Chen ............................... 710/38 |
| 2003/0131127 A1* | 7/2003 | King ........................ G06F 3/023 709/238 |
| 2005/0231462 A1* | 10/2005 | Chen ............................. 345/156 |
| 2006/0064509 A1* | 3/2006 | Chen ..................... H04W 4/001 709/250 |
| 2008/0133801 A1* | 6/2008 | Hsieh ..................... G06F 3/038 710/62 |
| 2009/0150664 A1* | 6/2009 | Zhang et al. .................. 713/153 |

(Continued)

FOREIGN PATENT DOCUMENTS

| JP | 4-116689 | 4/1992 |
| JP | 10-214070 | 8/1998 |
| JP | 11-85338 | 3/1999 |

(Continued)

OTHER PUBLICATIONS

Patent Abstracts of Japan, Publication No. 04-116689, Published Apr. 17, 1992.

(Continued)

*Primary Examiner* — Farley Abad
*Assistant Examiner* — Henry Yu
(74) *Attorney, Agent, or Firm* — Staas & Halsey LLP

(57) ABSTRACT

A KVM (K: Keyboard, V: Video, M: Mouse) switch includes: a plurality of first ports each of which is connected to at least one of a computer and another KVM switch, the another KVM switch having a plurality of third ports connectable to a computer; a second port; a connection unit that selects a first port from the plurality of first ports, and connects the selected first port to the second port; and a control unit that transmits a control signal to the another KVM switch via the selected first port when the first port connected to the computer is connected to the second port, the control signal being a signal for selecting a third port to be connected to the second port from the third ports.

4 Claims, 14 Drawing Sheets

(56) References Cited

U.S. PATENT DOCUMENTS

2010/0097326 A1* 4/2010 Liang .......................... 345/173
2010/0180055 A1* 7/2010 Lyon et al. .................... 710/62

FOREIGN PATENT DOCUMENTS

JP    2011-90703    5/2011
JP    2011-107914   6/2011

OTHER PUBLICATIONS

Patent Abstracts of Japan, Publication No. 10-214070, Published Aug. 11, 1998.
Patent Abstracts of Japan, Publication No. 11-085338, Published Mar. 30, 1999.
Patent Abstracts of Japan, Publication No. 2011-107914, Published Jun. 2, 2011.
Japanese Office Action dated May 31, 2016 in corresponding Japanese Patent Application No. 2012-200861.

* cited by examiner

KVM SWITCH AND KVM SYSTEM

CROSS-REFERENCE TO RELATED APPLICATION

This application is based upon and claims the benefit of priority of the prior Japanese Patent Application No. 2012-200861 filed on Sep. 12, 2012, the entire contents of which are incorporated herein by reference.

FIELD

A certain aspect of the embodiments is related to a KVM switch and a KVM system.

BACKGROUND

There is used a KVM (K: Keyboard, V: Video, M: Mouse) switch that is connected to a plurality of computers and a set of consoles, and selects a computer which inputs and outputs signals from/to the set of consoles. The set of consoles includes input and output devices, such as a keyboard, a mouse and a monitor. As types of the KVM switch, there are a single-type KVM switch which is connected to a set of consoles and a multi-type KVM switch which is connected to a plurality of sets of consoles. For example, Japanese Laid-open Patent Publication No. 2011-107914 discloses a KVM switch which is connected to a plurality of sets of consoles, and performs switching between the respective sets of consoles and a plurality of computers.

SUMMARY

According to an aspect of the present invention, there is provided a KVM (K: Keyboard, V: Video, M: Mouse) switch including: a plurality of first ports each of which is connected to at least one of a computer and another KVM switch, the another KVM switch having a plurality of third ports connectable to a computer; a second port; a connection unit that selects a first port from the plurality of first ports, and connects the selected first port to the second port; and a control unit that transmits a control signal to the another KVM switch via the selected first port when the first port connected to the computer is connected to the second port, the control signal being a signal for selecting a third port to be connected to the second port from the third ports.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
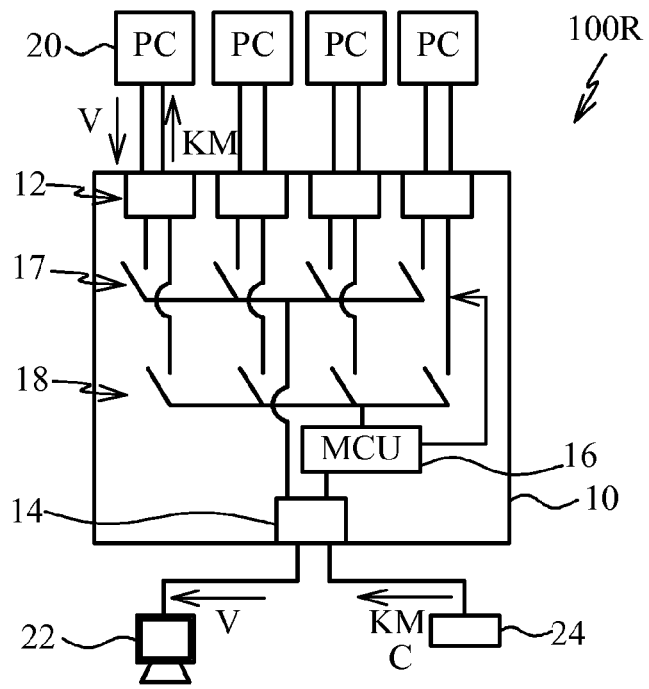
FIG. 1A is a block diagram illustrating a KVM system according to a first comparative example.

A first comparative example illustrates an example of a KVM (K: Keyboard, V: Video, M: Mouse) system using a single-type KVM switch. FIG. 1A is a block diagram illustrating a KVM system 100R according to the first comparative example.

As illustrated in FIG. 1A, the KVM system 100R includes a KVM switch 10, PCs (Personal Computer) 20, a monitor 22, and an input device 24.

The KVM switch 10 includes four ports 12. The PCs 20 are connected to the four ports 12, respectively. The monitor 22 and the input device 24 are connected to a port 14 included in the KVM switch 10. An image signal V output from any one of the four PCs 20 is input to the monitor 22. The monitor 22 displays an image based on the image signal V. A user can see the image and can input an operation signal KM for operating a corresponding PC 20 with the input device 24. The input device 24 includes a keyboard and a mouse, for example. Thus, the KVM switch 10 is a single monitor type KVM switch which corresponds to a single user.

The ports 12 and the port 14 are connected by switches 17 and 18. When any one of the switches 17 is turned on, the image signal V is transmitted from the port 12 connected to the turned-on switch 17 to the port 14. When any one of the switches 18 is turned on, the operation signal KM is transmitted from the port 14 to the port 12 connected to the turned-on switch 18. The MCU (Micro Control Unit) 16 controls the switches 17 and 18. The user can select the connection between the ports 12 and 14 by using the input device 24, for example. The MCU 16 turns on one of the switches 17 and one of the switches 18, based on an instruction of the user. That is, the MCU 16 selects one port 12 from the four ports 12 and connects the selected port 12 to the port 14. Thereby, the user can select a single PC 20 to be operated from among the four PCs 20.

However, since the number of PCs 20 connectable to the KVM switch 10 is limited, the KVM system 100R is lacking in extendibility. The extendibility is to increase the PC 20 and the monitor, for example. And, the number of monitors connected to the KVM switch 10 is one. Therefore, it is difficult for a plurality of users in remote places to see the image.

A second comparative example illustrates an example of a KVM system using a multi-monitor type KVM switch. FIG.

1B is a block diagram illustrating a KVM system 200R according to the second comparative example.

Figure 1B:
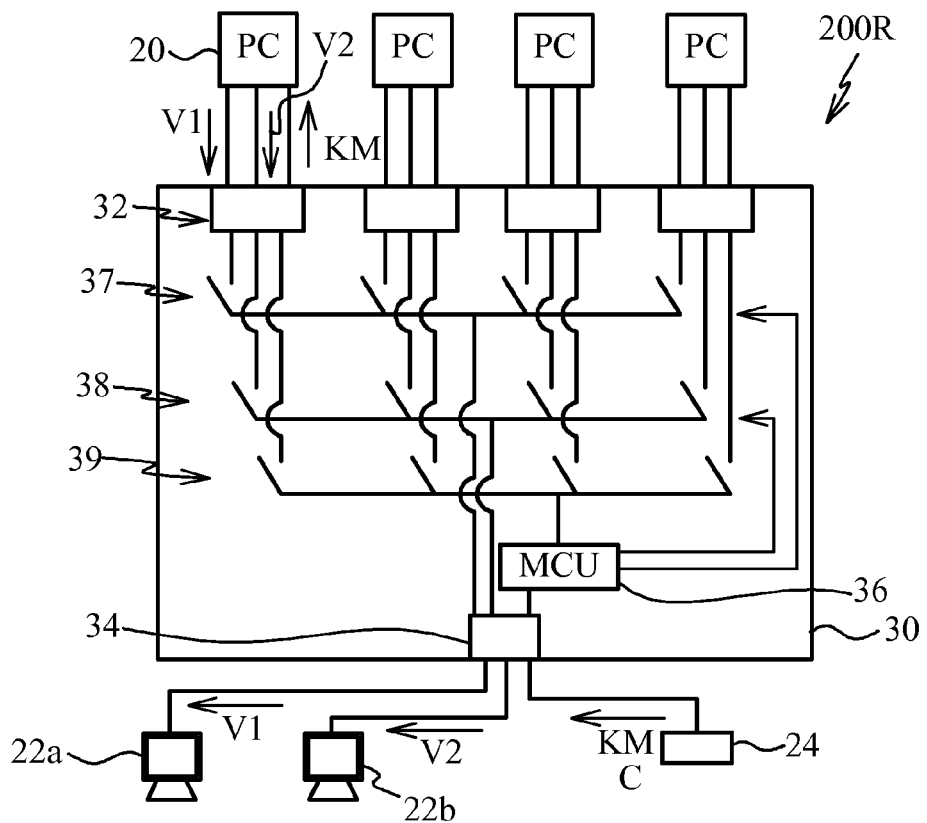
FIG. 1B is a block diagram illustrating a KVM system according to a second comparative example.

As illustrated in FIG. 1B, two image signals V1 and V2 are input to each port 32 of a KVM switch 30 from a corresponding PC 20. Two monitors 22a and 22b, and the input device 24 are connected to a port 34.

The MCU 36 controls ON/OFF of the switches 37 to 39. When any one of the switches 37 is turned on, the image signal V1 is transmitted from the port 32 connected to the turned-on switch 37 to the port 34. When any one of the switches 38 is turned on, the image signal V2 is transmitted from the port 32 connected to the turned-on switch 38 to the port 34. When any one of the switches 39 is turned on, the operation signal KM is transmitted from the port 34 to the port 32 connected to the turned-on switch 39. The image signal V1 is input to the monitor 22a, and the monitor 22a displays an image based on the image signal V1. The image signal V2 is input to the monitor 22b, and the monitor 22b displays an image based on the image signal V2.

According to the second comparative example, one user can see the two monitors. Alternatively, two users in remote places can see the same image. However, the number of PCs 20 connected to the KVM switch 30 is limited. Since the number of monitors connected to the KVM switch 30 is limited to two, it is difficult for the KVM switch 30 to deal with three or more users.

First Embodiment

Figure 2:
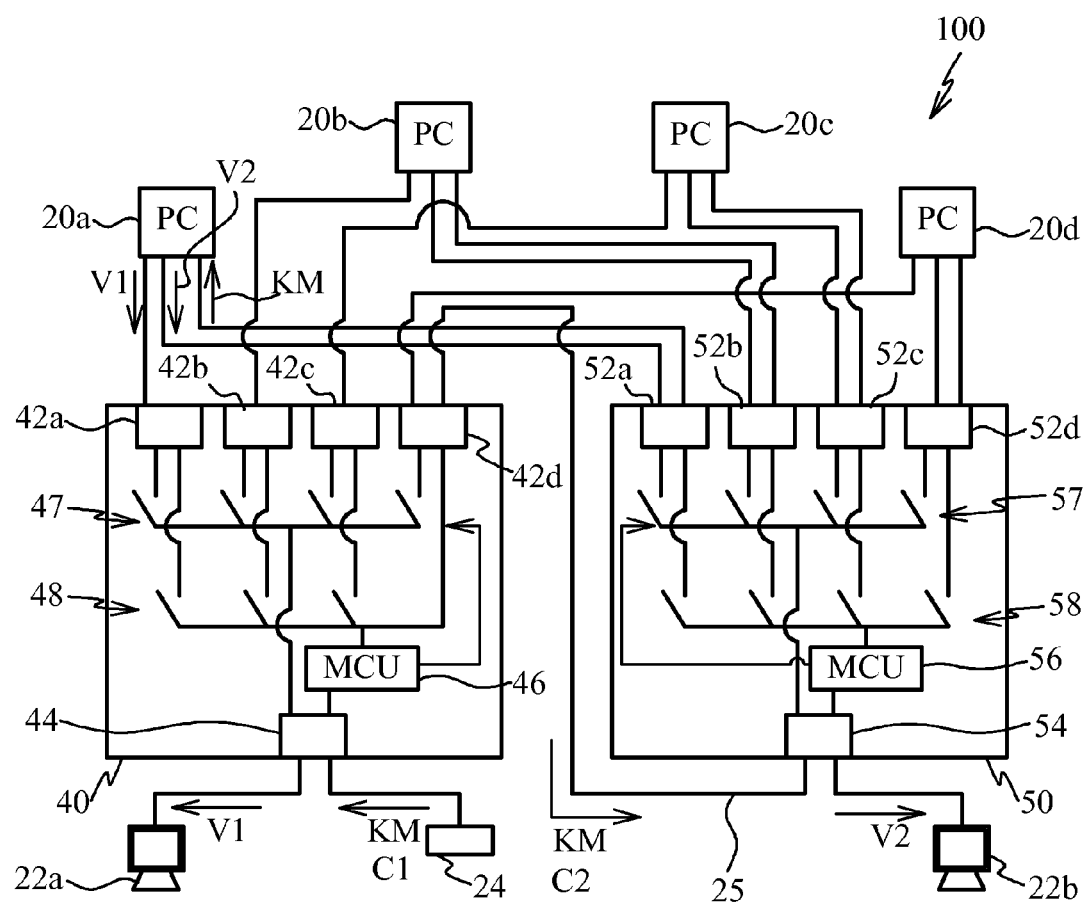
FIG. 2 is a block diagram illustrating a KVM system according to a first embodiment.

A first embodiment is an example of a KVM system which deals with dual monitors. FIG. 2 is a block diagram illustrating a KVM system 100 according to the first embodiment. Explanation of configuration common to the above-mentioned configuration is omitted.

As illustrated in FIG. 2, the KVM system 100 according to the first embodiment includes KVM switches 40 and 50. Four PCs 20a to 20d are connected to the KVM switches 40 and 50. The monitors 22a and the input device 24 are connected to the KVM switch 40. The monitor 22b is connected to the KVM switch 50. The KVM switches 40 is connected to the KVM switch 50. Each of the KVM switches 40 and 50 is the single monitor type KVM switch.

The KVM switch 40 includes ports 42a to 42d (e.g. an example of "first port(s)") and a port 44 (e.g. an example of "second port"). One switch 48 is provided between the port 44 and each of the ports 42a to 42d. A MCU 46 is provided between switches 48 and the port 44. The MCU 46 controls the switches 47 and 48, as described later. The KVM switch 50 includes ports 52a to 52d, a port 54, a MCU 56, and switches 57 and 58.

The ports 42a to 42d are connected to the PCs 20a to 20d with video cables, respectively. The image signals V1 output from the PCs 20a to 20d are input to the ports 42a to 42d via the video cables, respectively. The monitor 22a and the input device 24 are connected to the port 44. The ports 52a to 52d are connected to the PCs 20a to 20d with video cables, respectively. The image signals V2 output from the PCs 20a to 20d are input to the ports 52a to 52d via the video cables, respectively. Moreover, the ports 52a to 52d are connected to the PCs 20a to 20d with KM (K: Keyboard, M: Mouse) cables, respectively. The operation signal KM from each of the ports 52a to 52d is input to a corresponding PC.

The PC 20a is connected to the ports 42a and 52a. As described above, the image signal V1 output from the PC 20a is input to the port 42a, and the image signal V2 output from the PC 20a is input to the port 52a. The operation signal KM output from the port 52a is input to the PC 20a. For example, a video cable (hereinafter referred to as "V cable") is connected between the PC 20a and the port 42a. A cable in which a V cable and a keyboard/mouse (KM: Key Board/Mouse) cable are unified is connected between the PC 20a and the port 52a. Similarly, the PC 20b is connected to the ports 42b and 52b, the PC 20c is connected to the ports 42c and 52c, and the PC 20d is connected to the ports 42d and 52d. The port 42d is connected to the port 54 via a KM cable 25. Also, the monitor 22b is connected to the port 54.

Figure 3A:
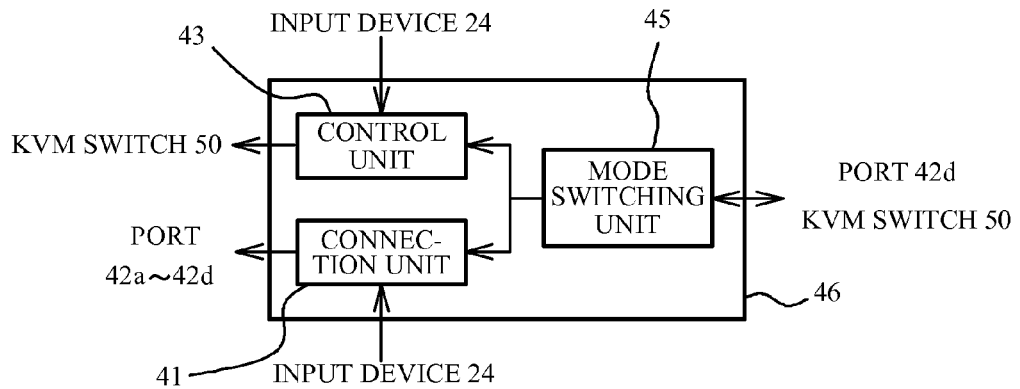
FIGS. 3A and 3B are functional block diagrams illustrating a MCU (Micro Control Unit)

FIG. 3A is a functional block diagram illustrating the MCU 46. As illustrated in FIG. 3A, the MCU 46 functions as a connection unit 41, a control unit 43, and a mode switching unit 45. The connection unit 41 switches ON/OFF of the switches 47 and 48 based on a control signal C1 (see FIG. 2) input from the input device 24, selects one port from the four ports 42a to 42d, and connects the selected port to the port 44. The control unit 43 generates a control signal C2 (see FIG. 2) based on the control signal C1 input from the input device 24, and transmits the control signal C2 to the KVM switch 50. In addition, the control unit 43 transmits the operation signal KM to the KVM switch 50. The connection unit 41 and the control unit 43 operate according to a mode switched by the mode switching unit 45. Here, the mode switching unit 45 is mentioned later in detail.

Figure 3B:
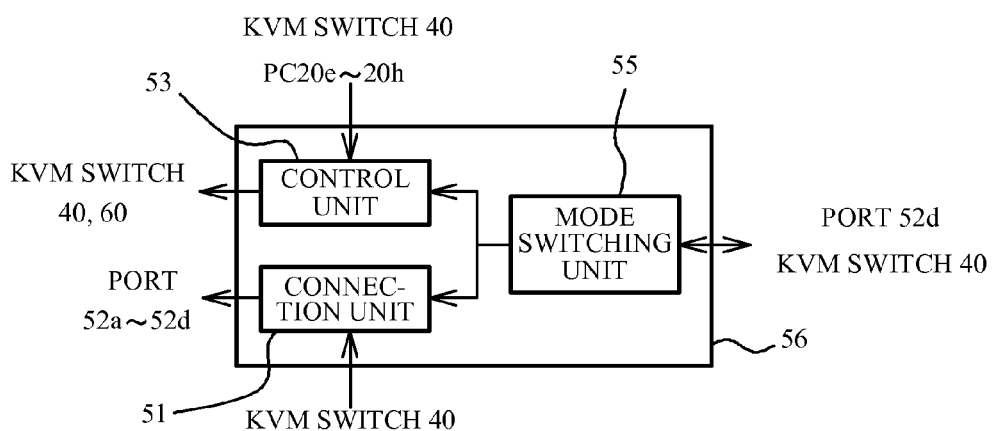

FIG. 3B is a functional block diagram illustrating the MCU 56. The MCU 56 functions as a connection unit 51, a control unit 53, and a mode switching unit 55. The connection unit 51 selects one port from the four ports 52a to 52d based on the control signal C2 input from the KVM switch 40, and connects the selected port to the port 54. The PCs 20e to 20h in FIG. 3B are explained in the second embodiment, and the control unit 53 and a KVM switch 60 are explained in a variation example of the first embodiment. The mode switching unit 55 is also mentioned later.

Figure 4:
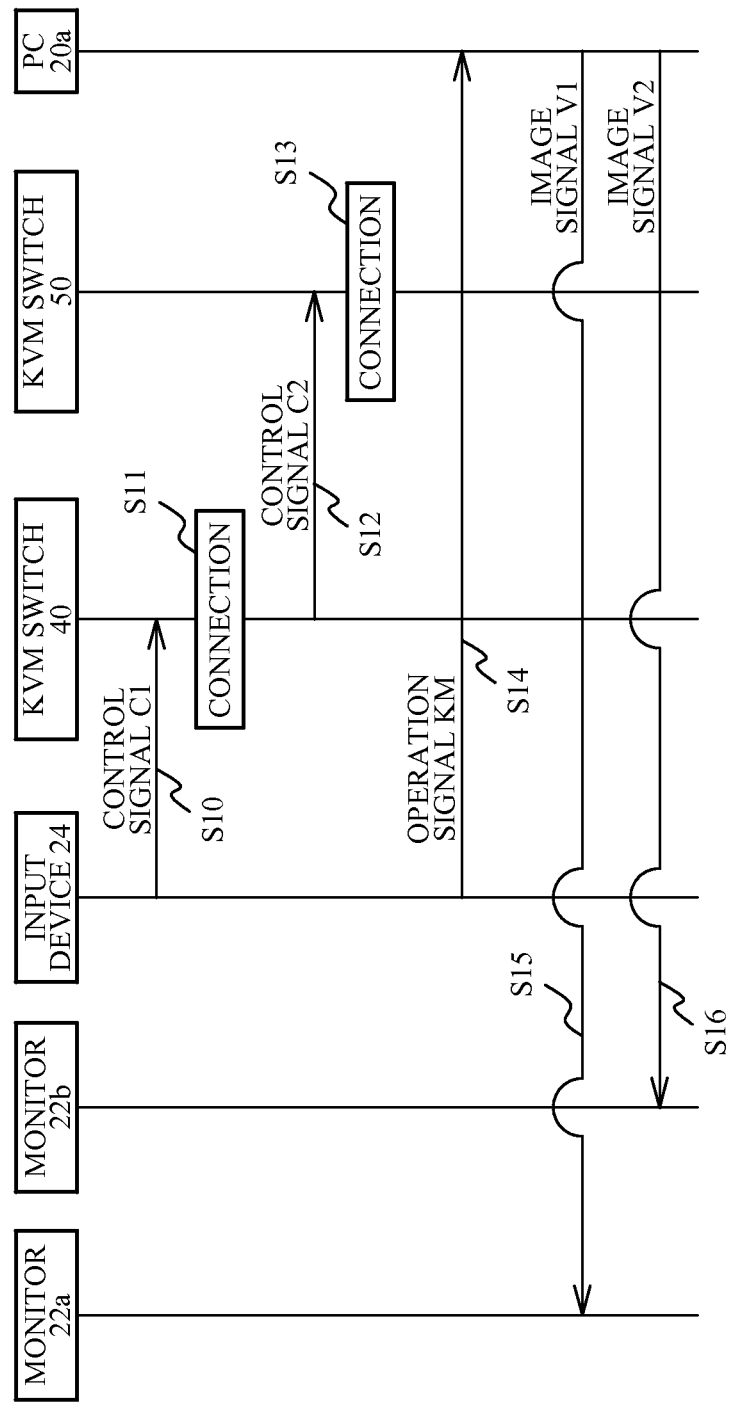
FIG. 4 is a sequence diagram illustrating the control of the KVM system.

FIG. 4 is a sequence diagram illustrating the control of the KVM system 100. The "PC" in FIG. 4 indicates a single PC selected from the PCs 20a to 20d. A place at which solid lines cross, such as the operation signal KM and the KVM switch 40, indicates that a signal is transmitted through the corresponding element. A place in which a solid line bypasses another solid line, such as the image signal V1 and the KVM switch 50, indicates that a signal is transmitted without passing the corresponding element. Here, a description is given of a case where the switch 48 between the port 42d and the port 44 illustrated in FIG. 2 is turned on.

As illustrated in FIG. 4, the user selects one PC from among the PCs 20a to 20d by using the input device 24. It is assumed that the PC 20a is selected in this example. The control signal C1 is output from the input device 24 (step S10). The control signal C1 cause the connection unit 41 of the KVM switch 40 to select any one of the ports 42a to 42d. The connection unit 41 selects the port 42a from the four ports 42a to 42d based on the control signal C1 transmitted from the input device 24, and connects the port 42a to the port 44 (step S11). Specifically, the connection unit 41 turns on the switch 47 between the port 42a and the port 44. The control unit 43 of the KVM switch 40 generates the control signal C2 based on the control signal C1, and transmits the control signal C2 to the KVM switch 50 via the port 42d and the KM cable 25 (step S12). The control signal C2 cause the connection unit 51 of the KVM switch 50 to select any one of the ports 52a to 52d. Here, the control signal C2 cause the connection unit 51 to select the port 52a connected to the PC 20a. The connection unit 51 selects the port 52a from the ports 52a to 52d based on the received control signal C2, controls the switches 57 and 58, and connects the port 52a to the port 54 (step S13).

Thereby, the port 44 is connected to the port 52a via the port 42d, the KV cable 25, and the port 54.

The user inputs the operation signal KM with the input device 24. The control unit 43 transmits the operation signal KM to the KVM switch 50 via the port 42d and the KM cable 25. The operation signal KM is transmitted to the PC 20a via the ports 54 and 52a of the KVM switch 50 (step S14). The PC 20a outputs the image signals V1 and V2 according to the input of the operation signal KM. The image signal V1 is input to the monitor 22a via the ports 42a and 44 of the KVM switch 40 (step S15). The monitor 22a displays the image based on the image signal V1. The image signal V2 is input to the monitor 22b via the ports 52a and 54 of the KVM switch 50 (step S16). The monitor 22b displays the image based on the image signal V2.

In the first embodiment, the port 42d is connected to the port 44 (i.e., the switch 48 between the port 42d and the port 44 is turned on). In this case, the control signal C2 is transmitted from the KVM switch 40 to the KVM switch 50. Therefore, the user can select one port of the KVM switch 50 via the KVM switch 40. Also, the operation signal KM is transmitted from the KVM switch 40 to the KVM switch 50, and is input to the PC. Thereby, the user can operate the PC via the KVM switches 40 and 50. Thus, the KVM system 100 to which the two KVM switches 40 and 50 are connected can be built.

In the first embodiment, two ports connected to the same PC are selected from the ports 42a to 42d and the ports 52a to 52d, respectively. Thereby, a user of the KVM switch 40 can operate the PC, and the user of the KVM switch 40 and another user of the KVM switch 50 can see the same image. Thus, the KVM system 100 according to the first embodiment functions as the KVM system which deals with the dual monitors.

The KVM switch 40 is connected to the PCs 20a to 20d via only video cables. A port to which the KM cable is connected is only the port 42d among the ports 42a to 42d. Therefore, transmitting the operation signal KM via the port 42d and the KVM switch 50 is required in order to operate any one of the PCs 20a to 20d. Consequently, it is desirable that the switch 48 between the port 42d and the port 44 always turns on. Thereby, the operation signal KM and the control signal C2 can be transmitted from the KVM switch 40 to the KVM switch 50. Since the switch 48 is not switched, speedup of the control of the KVM switch 40 is enabled. Here, since the switch 48 between the port 42d and the port 44 is always turned on, FIG. 2 illustrates the switch 48 as a line.

Figure 5:
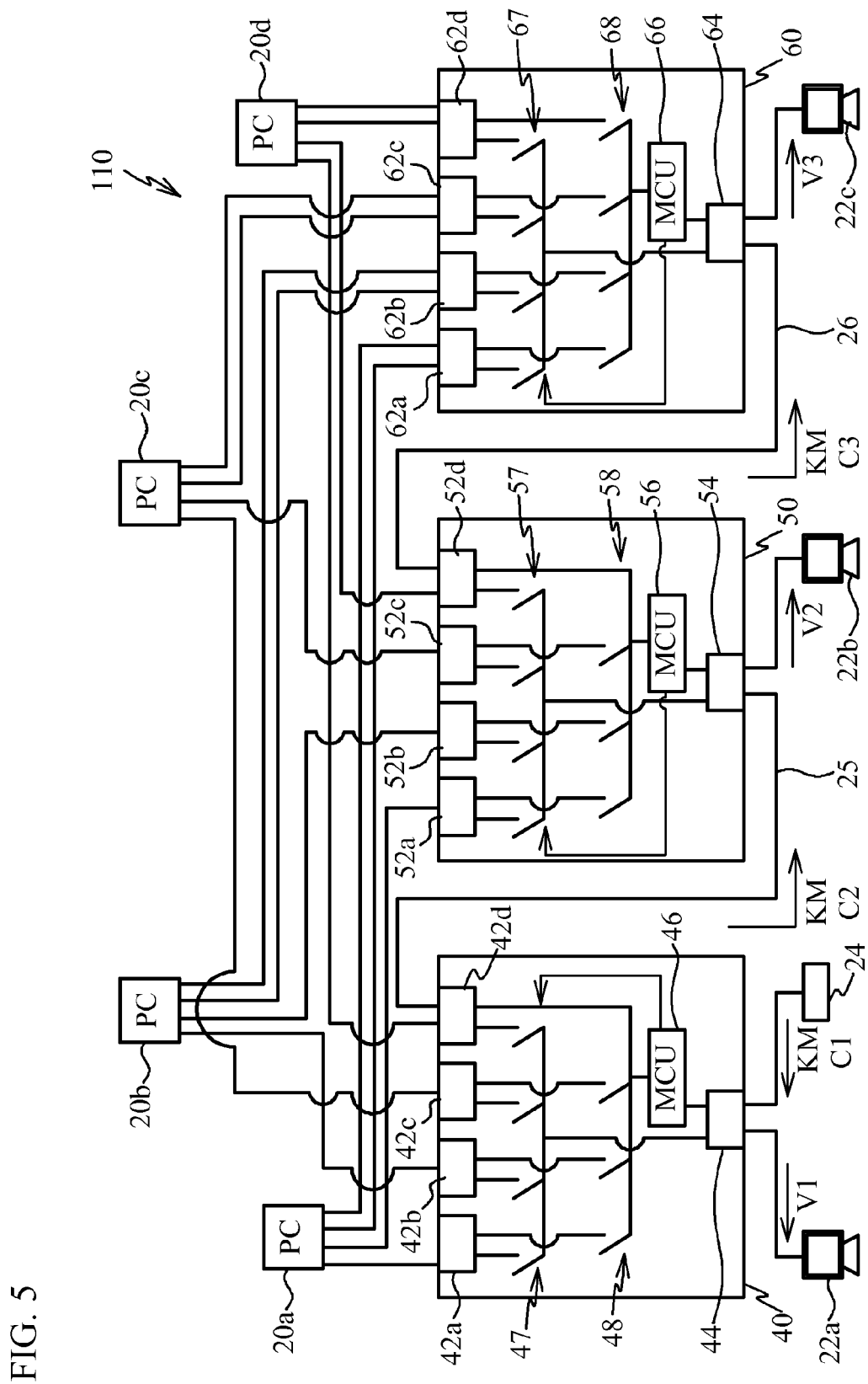
FIG. 5 is a block diagram illustrating the KVM system according to a variation example of the first embodiment.

In the first embodiment, since the single monitor type KVM switches are used, high extendibility can be acquired. A description will be given of a variation example of the first embodiment as an extended example of the KVM system 100. FIG. 5 is a block diagram illustrating a KVM system 110 according to the variation example of the first embodiment.

In the KVM system 110 according to the variation example, three KVM switches 40, 50 and 60 are connected as illustrated in FIG. 5. A port 64 of the KVM switch 60 is connected to the port 52d of the KVM switch 50 via a cable 26. In addition, the port 64 is connected to the monitor 22c. The PC 20a is connected to the ports 42a, 52a and 62a. The PC 20b is connected to the ports 42b, 52b and 62b. The PC 20c is connected to the ports 42c, 52c and 62c. The PC 20d is connected to the ports 42d, 52d and 62d. The switch 48 between the ports 42d and 44, and the switch 58 between the ports 52d and 54 are always turned on. Therefore, the switch 48 between the ports 42d and 44, and the switch 58 between the ports 52d and 54 are illustrated as lines, respectively.

The control of the KVM system 110 is control in which the KVM switch 60 and the monitor 22c are added to the sequence diagram illustrated in FIG. 4. The control unit 43 (see FIG. 3A) generates the control signal C2 and a control signal C3, and transmits the control signals C2 and C3 to the KVM switch 50. The control unit 53 of the KVM switch 50 (see FIG. 3B) transmits the control signal C3 to the KVM switch 60. A MCU 66 selects one port from the ports 62a to 62d based on the control signal C3, and connects the selected port to the port 64. The operation signal KM is transmitted to the KVM switch 60 via the KVM switch 50. The operation signal KM is input to any one of the PCs 20a to 20d via the port 64 and the port selected from the ports 62a to 62d. An image signal V3 output from any one of the PCs 20a to 20d is input to the monitor 22c.

According to the variation example of the first embodiment, three users in remote places can see the same image. The number of KVM switches may be four or more. Thereby, the KVM system which deals with the multi-monitors can be built.

Second Embodiment

Figure 6:
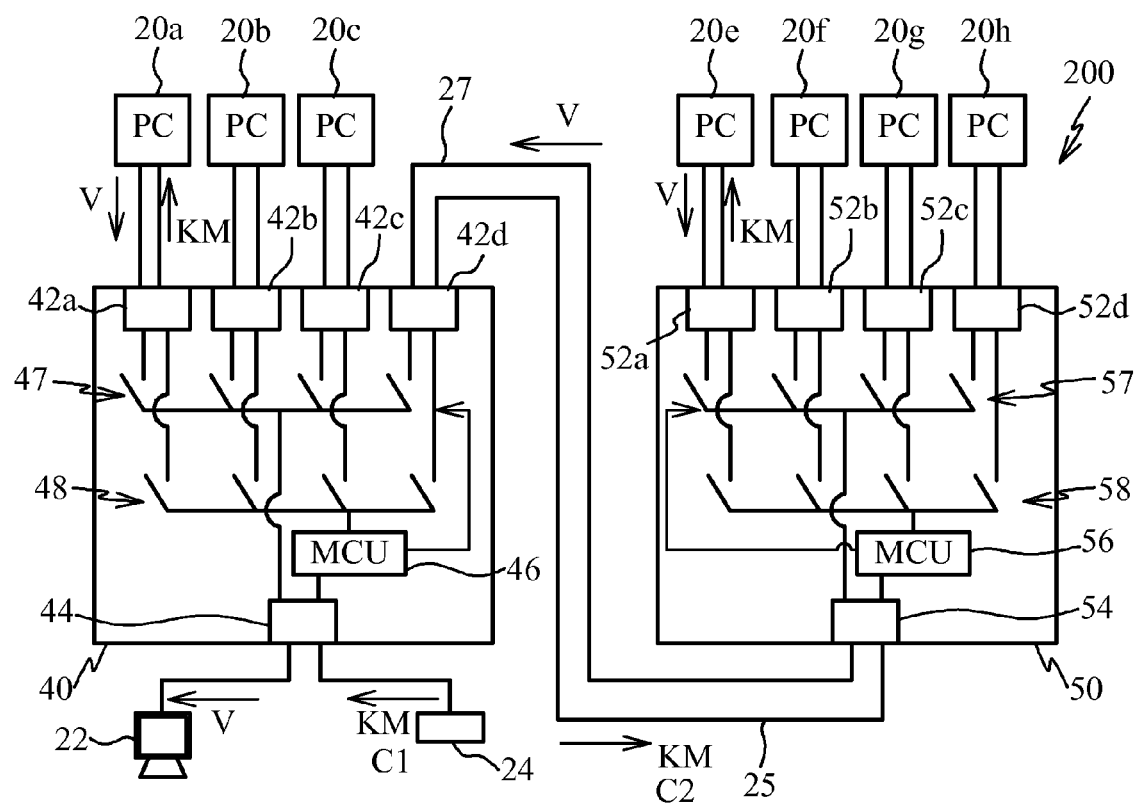
FIG. 6 is a block diagram illustrating a KVM system according to a second embodiment.

A second embodiment is an example of a KVM system in which two KVM switches are cascade-connected. FIG. 6 is a block diagram illustrating a KVM system 200 according to the second embodiment. Among seven PCs 20a to 20h, three PCs 20a to 20c are connected to the KVM switch 40, and four PCs 20e to 20h are connected to the KVM switch 50. The monitor 22 and the input device 24 are connected to the KVM switch 40.

The port 42d illustrated in FIG. 6 is not connected to the PC, and is connected to the port 54 via the KM cable 25 and the V cable 27. The KVM switch 40 can transmit the operation signal KM and the control signal C2 to the KVM switch 50 via the KM cable 25. The KVM switch 50 can transmit the image signal V to the KVM switch 40 via the V cable 27. The ports 52a to 52d are connected to the PCs 20e to 20h, respectively. That is, the ports 42a to 42c and the ports 52a to 52d are mutually connected to the different PCs, respectively. Each of the PCs 20a to 20c can transmit the image signal V to the KVM switch 40. The KVM switch 40 can transmit the operation signal KM to each of the PC 20a to 20c. Each of the PCs 20e to 20h can transmit the image signal V to the KVM switch 50. The KVM switch 50 can transmit the operation signal KM to each of the PC 20e to 20h.

Figure 7A:
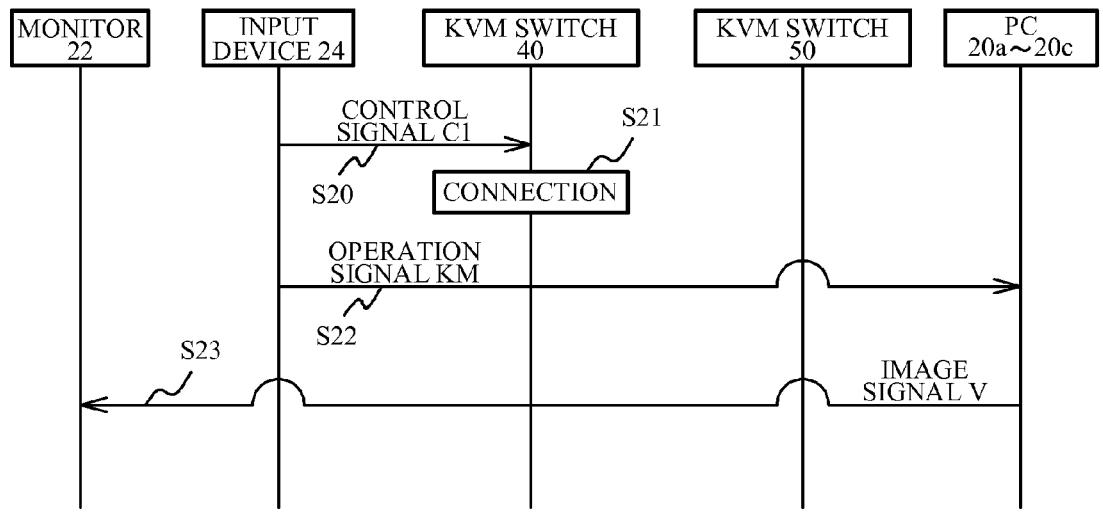
FIGS. 7A and 7B are sequence diagrams illustrating the control of the KVM system.
Figure 7B:
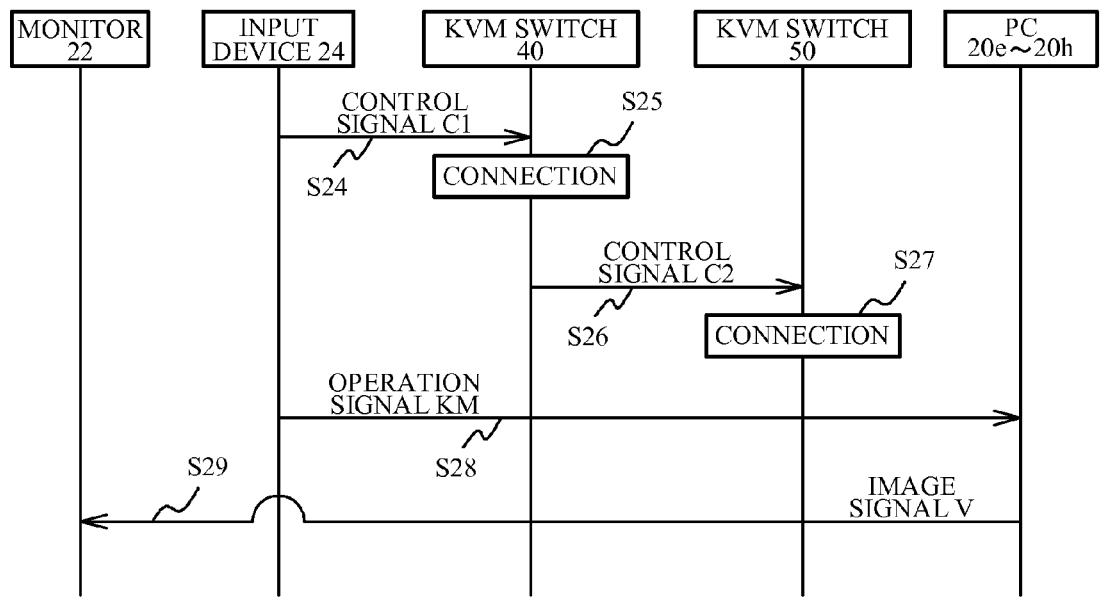

FIGS. 7A and 7B are sequence diagrams illustrating the control of the KVM system 200. FIG. 7A illustrates an example in which the PC connected to the KVM switch 40 is operated. As illustrated in FIG. 7A, the control signal C1 is input to the KVM switch 40 (step S20). The connection unit 41 illustrated in FIG. 3 selects one port from the ports 42a to 42d, and connects the selected port to the port 44 (step S21). For example, when the PC 20a is operated, the port 42a is selected. At this time, the switches 47 and 48 between the ports 42a and 44 are turned on. The operation signal KM output from the input device 24 is input to the PC 20a via the ports 44 and 42a (step S22). The image signal V output from the PC 20a is input to the monitor 22 via the ports 42a and 44 (step S23).

FIG. 7B illustrates an example in which the PC connected to the KVM switch 50 is operated. As illustrated in FIG. 7B, the control signal C1 is input to the KVM switch 40 (step S24). The connection unit 41 selects the port 42d, and connects the selected port 42d to the port 44 (step S25). The switches 47 and 48 between the ports 42d and 44 are turned on. The user inputs the control signal C2 by using the input device 24. The control unit 43 transmits the control signal C2 to the KVM switch 50 (step S26). The connection unit 51 illustrated in FIG. 3B connects one port selected from the ports 52a to 52d to the port 54, based on the control signal C2 (step S27). For example, when the PC 20e is operated, the port 52a is selected. The control unit 43 transmits the operation signal KM to the KVM switch 50. The operation signal KM is input to the PC 20e (step S28). The control unit 53 of the KVM switch 50 transmits the image signal V output from the PC 20e, to the KVM switch 40. The image signal V is input to the monitor 22 (step S29).

According to the second embodiment, the user can operate the PCs 20a to 20c connected to the KVM switch 40 and the PCs 20e to 20h connected to the KVM switch 50 by using the input device 24, as illustrated in FIGS. 7A and 7B. In addition, the KVM switch 50 transmits the image signal V output from any one of the PC 20e to 20h to the KVM switch 40. Thereby, the user can see an image based on the image signal V output from the PC 20e to 20h. Thus, the KVM system 200 in which a plurality of KVM switches are cascade-connected can be built.

In addition to the port 42d, another KVM switch may be connected to any of the port 42a to 42c. Thereby, the operable PC can be increased. For example, since four KVM switch are connected to the ports 42a to 42d, respectively, and the PCs up to 4 sets are connected to each KVM switch, the KVM system that can operate the PCs up to 16 sets can be built. Moreover, KVM switches may be connected to the ports 52a to 52d.

Third Embodiment

Figure 8:
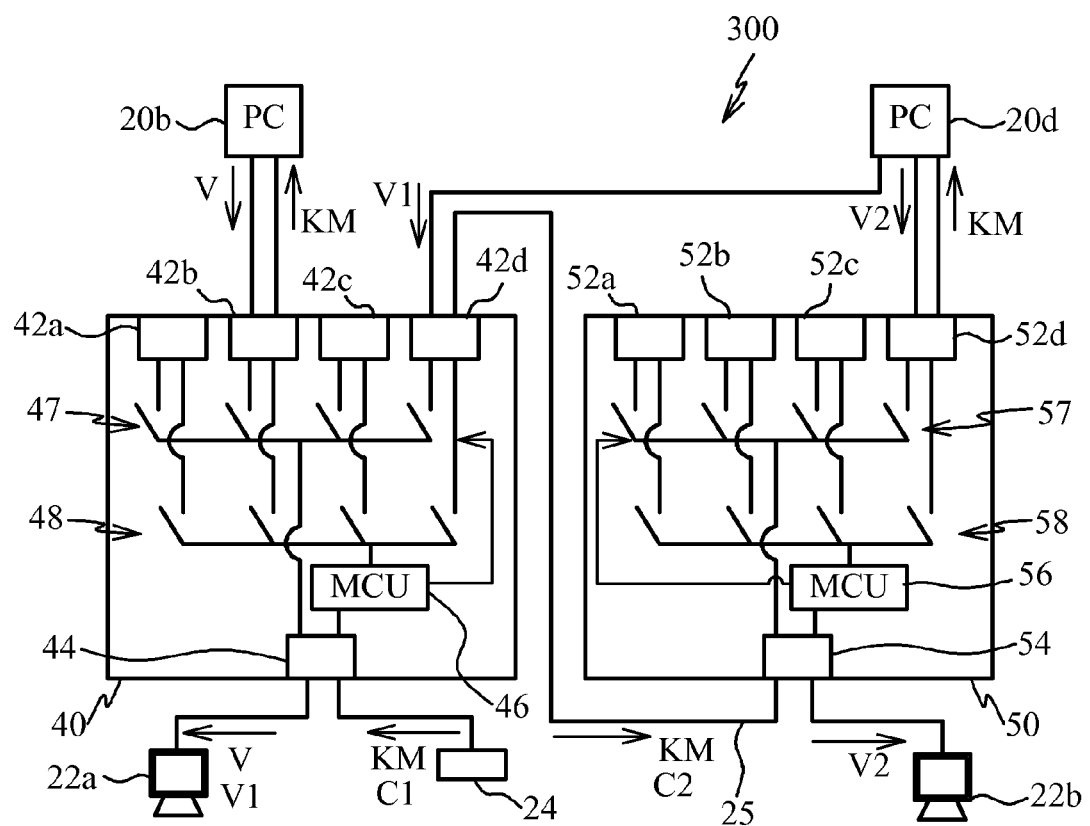
FIG. 8 is a block diagram illustrating a KVM system according to a third embodiment.

A third embodiment is an example of a KVM system that deals with both of the single monitor and the dual monitors. FIG. 8 is a block diagram illustrating a KVM system 300 according to the third embodiment.

As illustrated in FIG. 8, the PC 20b that can transmit the operation signal KM and receive the image signal V is connected to the port 42b. The PC 20d the can receive the image signal V1 is connected to the port 42d. The PC 20d that can transmit the operation signal KM and receive the image signal V2 is connected to the port 52d. The PC 20d is not connected to the ports 42a to 42c. The port 42d is connected to the port 54 via the KM cable 25.

When the PC 20b is operated, the KVM system 300 can perform the control of the FIG. 7A. When the PC 20d is operated, the KVM system 300 can perform the control of the FIG. 4. According to the third embodiment, the KVM system 300 that can deal with both of the single monitor and the dual monitors can be built.

Figure 9:
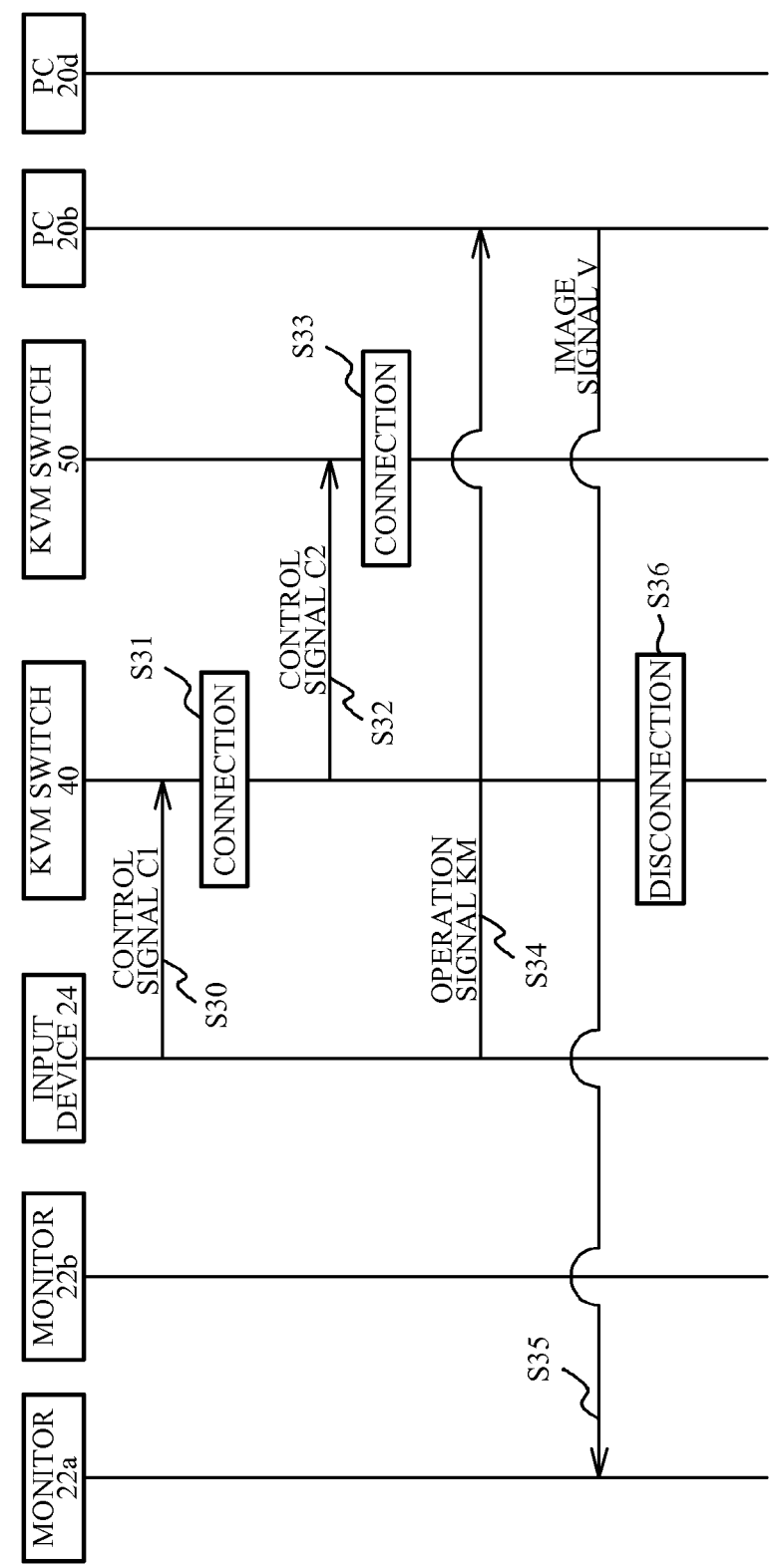
FIG. 9 is a sequence diagram illustrating the control of the KVM system.
Figure 10:
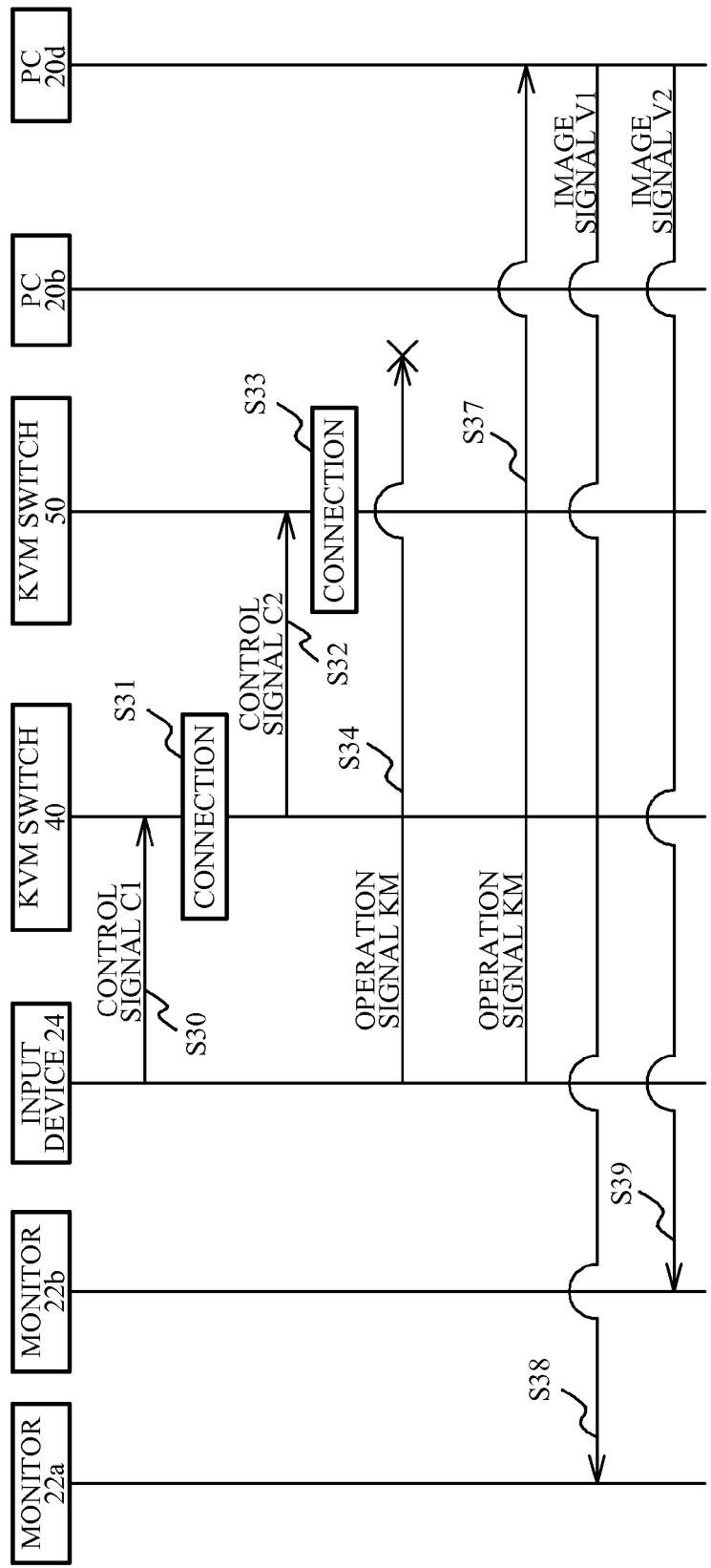
FIG. 10 is a sequence diagram illustrating the control of the KVM system.

A description will be given of switching control between a single monitor mode and a multi-monitor mode. FIGS. 9 and 10 are sequence diagrams illustrating switching control of the KVM system 300. The switch 48 between the ports 42d and 44 is turned on.

FIG. 9 illustrates an example of switching to the single monitor mode. As illustrated in FIG. 9, the control signal C1 is input to the KVM switch 40 (step S30). The connection unit 41 selects the port 42b, and connects the port 42b to the port 44 (step S31). That is, the switches 47 and 48 between the ports 42b and 44 are turned on. The control signal C2 output from the KVM switch 40 is input to the KVM switch 50 (step S32). The connection unit 51 connects the port 52b to the port 54 (step S33). The operation signal KM output from the input device 24 is input to the PC 20b (step S34). The image signal V output from the PC 20b is input to the monitor 22a (step S35). As illustrated in steps S34 and S35, the PC 20b is operated. Therefore, the communication between the KVM switches 40 and 50 is not needed. Accordingly, the connection unit 41 disconnects the connection between the ports 42b and 44 (step S36). Thus, the switching to the single monitor mode is performed.

FIG. 10 illustrates an example of switching to the multi-monitor mode. It is assumed that, in an example of FIG. 10, the PC 20b is not connected to the port 42b. Steps S30 to S33 of FIG. 10 are the same as those of FIG. 9. The operation signal KM is input to the port 42b. However, the PC 20b is not connected to the port 42b, and hence the operation signal KM is not input to the PC 20b (step S34). When the operation signal KM cannot be transmitted to the PC 20b, the control unit 43 transmits the operation signal KM to the KVM switch 50. The operation signal KM is input to the PC 20d (step S37). The PC 20d outputs the image signals V1 and V2. The image signal V1 is input to the monitor 22a via the port 42d (step S38). The image signal V2 is input to the monitor 22b via the port 52d (step S39). Thus, the switching to the multi-monitor mode is performed.

In FIG. 9, it is not necessary to perform steps S32 and S33. This is because the PC connected to the KVM switch 50 is not operated in the example of FIG. 9, and hence the selection of the port in the KVM switch 50 is not necessary. The steps S32 and S33 correspond to steps S12 and S13 of FIG. 4, and step S26 and S27 of FIG. 7B. In order for the KVM switch 50 of the third embodiment to have compatibility with the control of FIG. 4 and FIG. 7B, it is desirable to perform steps S32 and S33 in FIG. 7B.

Other PCs may be connected to the ports 42a and 42c. For example, the same PC may be connected to the ports 42a and 52a. Thus, the KVM system 300 has large extensibility. As illustrated in the first to the third embodiments, the ports 42a to 42d and the ports 52a to 52d are connected to at least one of the PC or the KVM switch.

The KVM switches 40 and 50 can deal with all of the first to the third embodiments. A description will be given of switching between the multi-monitor mode like the first embodiment and the cascade connection mode like the second embodiment.

Figure 11A:
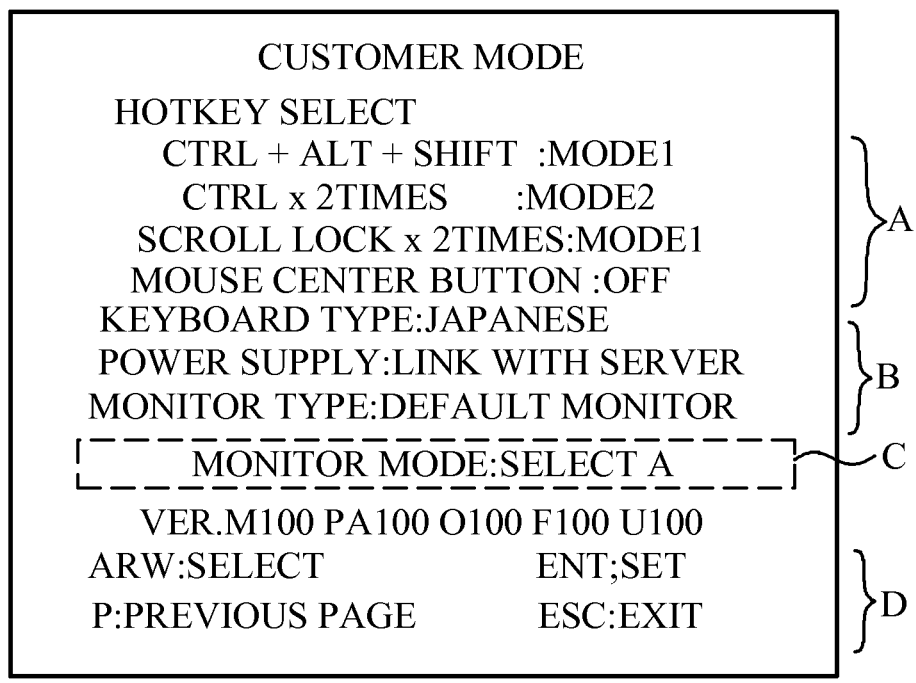
FIG. 11A is a diagram illustrating a screen for switching.

FIG. 11A is a diagram illustrating a screen for switching. An area A illustrated in FIG. 11A indicates a corresponding relationship between a hotkey and the control. An area B indicates the types of hardware (e.g. a keyboard, a mouse, a monitor, and so on) connected to the KVM switch. An area C indicates a mode of the KVM switch. For example, "SELECT A" is the multi-monitor mode like the first and the third embodiments, and "SELECT B" (not shown) is the cascade connection mode like the second embodiment. An area D indicates a corresponding relationship between each key and the control.

Figure 11B:
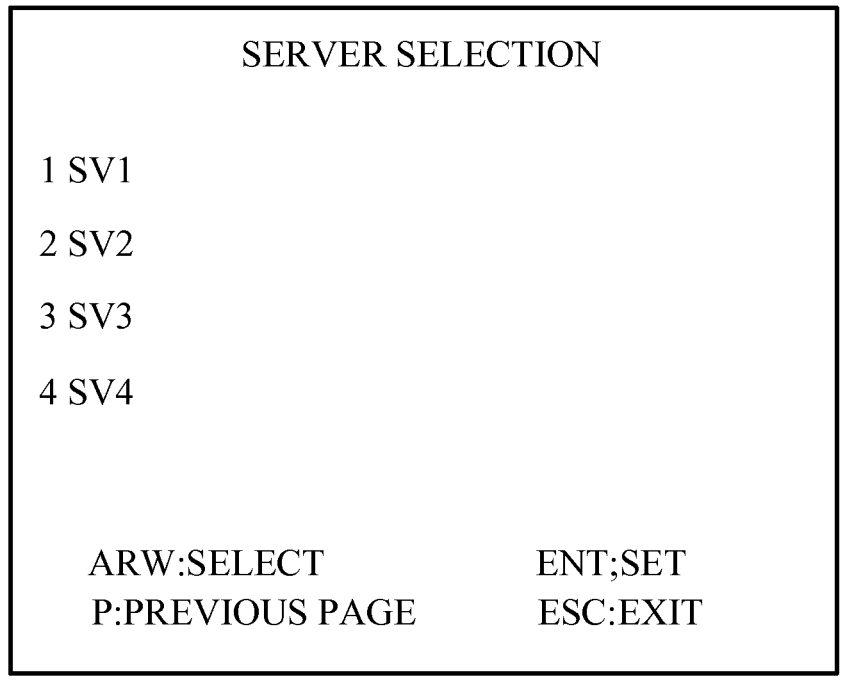
FIG. 11B is a diagram illustrating a screen used for the first and the third embodiments.

FIG. 11B is a diagram illustrating a screen used for the first and the third embodiments. Marks "SV1" to "SV4" in FIG. 11B correspond to the PCs 20a to 20d of FIG. 2, respectively. For example, when the user depresses a key "1" of the keyboard, the SV 1 (i.e., the PC 20a) can be selected. That is, the connection unit 41 connects the port 42a to the port 44 based on the control signal C1 indicative of the selection of the port 42a. The connection unit 51 connects the port 52a to the port 54 based on the control signal C2 indicative of the selection of the port 52a.

Figure 12A:
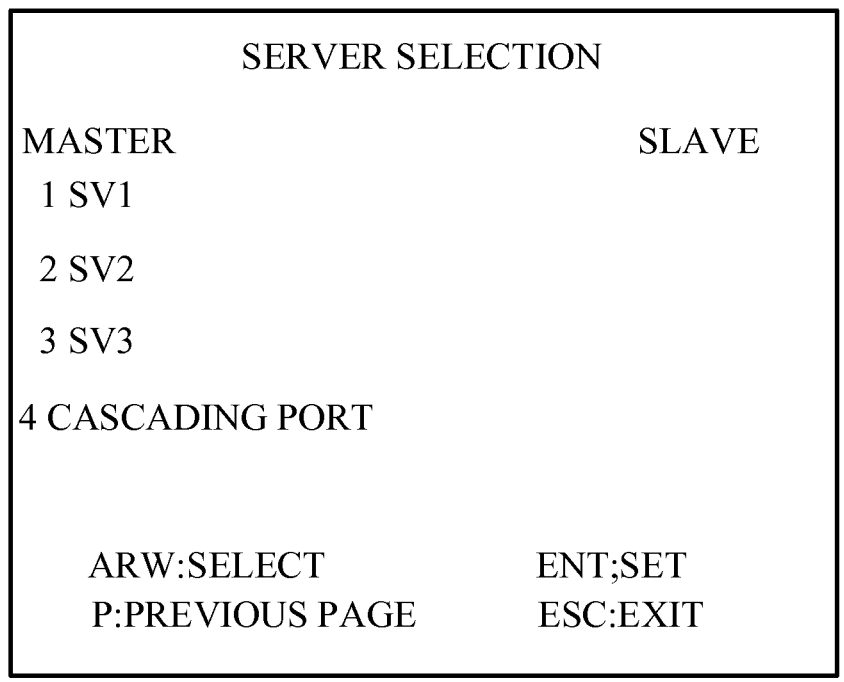
FIGS. 12A and 12B are diagrams illustrating screens used for the second embodiment.
Figure 12B:
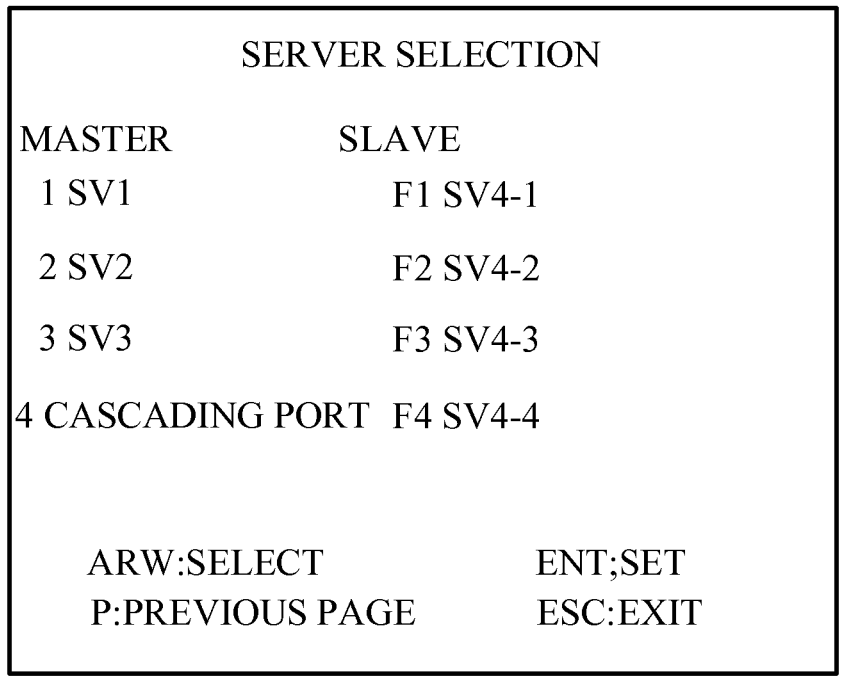

FIGS. 12A and 12B illustrates examples of screens used for the second embodiment. A mark "MASTER" in FIG. 12A corresponds to the KVM switch 40.

A mark "SLAVE" in FIG. 12A corresponds to the KVM switch 50. A mark "CASCADING PORT" indicates a port connected to the KVM switch 50, such as the port 42d of FIG. 6.

When the mark "CASCADING PORT" (e.g. the port 42d) is selected, a selection screen for "SLAVE" (e.g. the KVM switch 50) is indicated, as illustrated in FIG. 12B. Marks "SV4-1" to "SV4-4" correspond to the PCs 20e to 20h, respectively. For example, the user can select the SV4-1 (i.e., the PC 20e) by depressing a F1 key. For example, the indication of FIGS. 12A and 12B can be mutually switched by a shift key.

Figure 13:
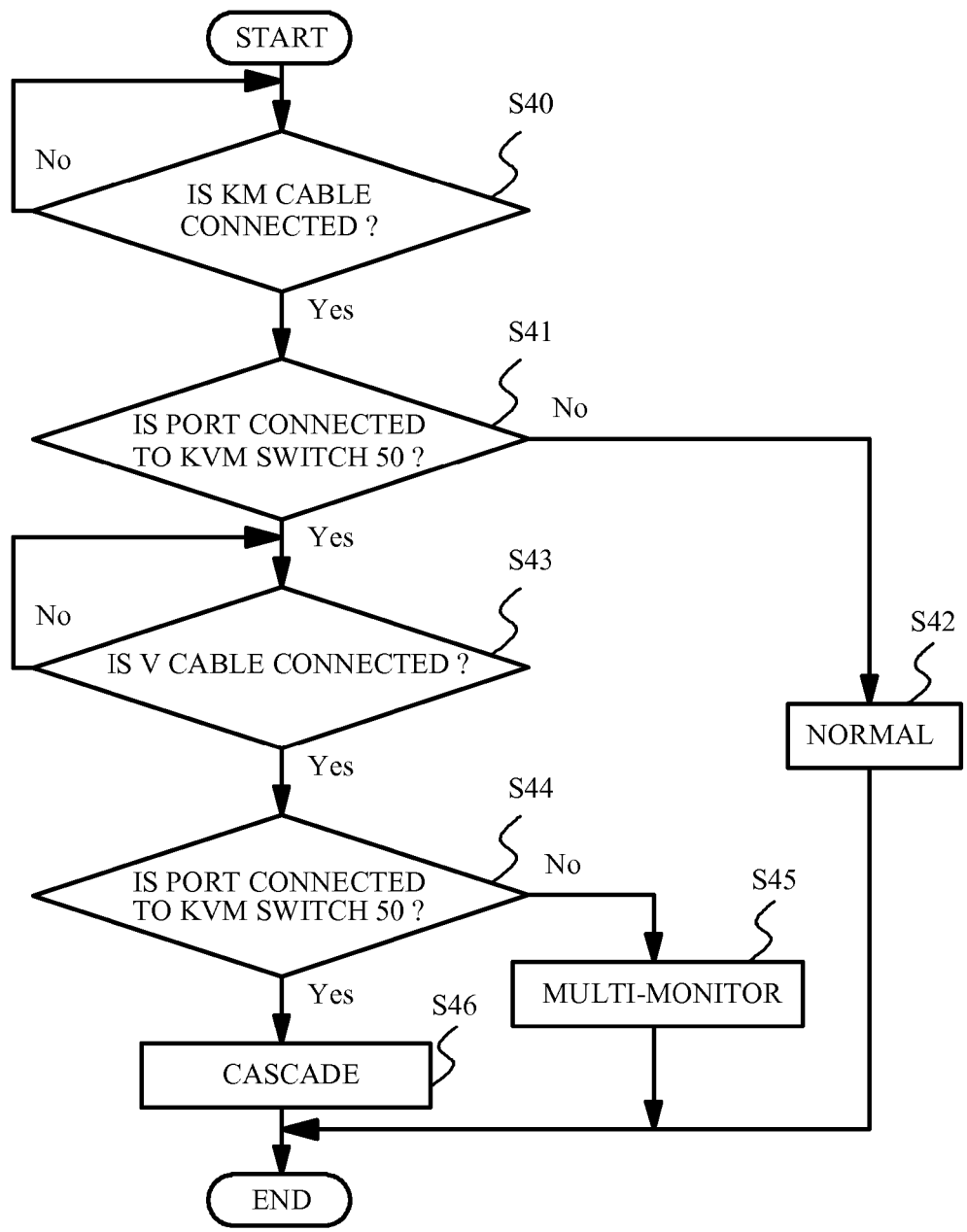
FIG. 13 is a flowchart illustrating automatic switching control of the KVM switch.

Automatic switching of the modes is also enabled. FIG. 13 is a flowchart illustrating automatic switching control of the KVM switch 40.

As illustrated in FIG. 13, the mode switching unit 45 determines whether the KM cable 25 is connected to the port 42d (step S40). When the KM cable 25 is inserted into the port 42d, for example, a signal is output from the port 42d to the mode switching unit 45. When the mode switching unit 45 detects the signal, it is determined that the KM cable 25 is connected to the port 42d (i.e., YES in step S40). When the mode switching unit 45 does not detect the signal, it is determined that the KM cable 25 is not connected to the port 42d (i.e., NO in step S40).

When the determination of step S40 is NO, step S40 is repeatedly performed. When the determination of step S40 is YES, the mode switching unit 45 determines whether the port 42d is connected to the KVM switch 50 via the KM cable 25 (step S41). The determination is performed based on whether the MCU 46 can transmit or receive a signal to/from the MCU 56 of the KVM switch 50 via the KM cable 25, for example. When the MCU 46 cannot transmit or receive the signal, the determination of step S41 is NO. In this case, the mode switching unit 45 switches a current mode to a normal mode (step S42). The normal mode means that the KVM switch 50 is not connected to the ports 42a to 42d, and at least one PC is connected to the ports 42a to 42d, as illustrated in an example of FIG. 1A.

When the MCU 46 can transmit or receive the signal, the determination of step S41 is YES. In this case, the mode switching unit 45 determines whether the V cable 27 is connected to the port 42d (step S43). When the determination of step S43 is NO, step S43 is repeatedly performed. When the determination of step S43 is YES, the mode switching unit 45 determines whether the port 42d is connected to the KVM switch 50 via the V cable 27 (step S44). The determination is performed based on whether the MCU 46 can transmit or receive a signal to/from the MCU 56 via the V cable 27, for example. When the determination of step S44 is NO, the mode switching unit 45 determines that the port 42d is connected to the PC 20d. At this time, the mode switching unit 45 switches the current mode to the multi-monitor mode (step S45). This corresponds to the examples of FIGS. 2, 5 and 8. When the determination of step S44 is YES, the mode switching unit 45 switches the current mode to the cascade connection mode (step S46). This corresponds to the example of FIG. 6. After steps S45 and S46, the automatic switching control is terminated. The KVM switch 40 performs control according to the mode decided by steps S45 and S46.

Figure 14:
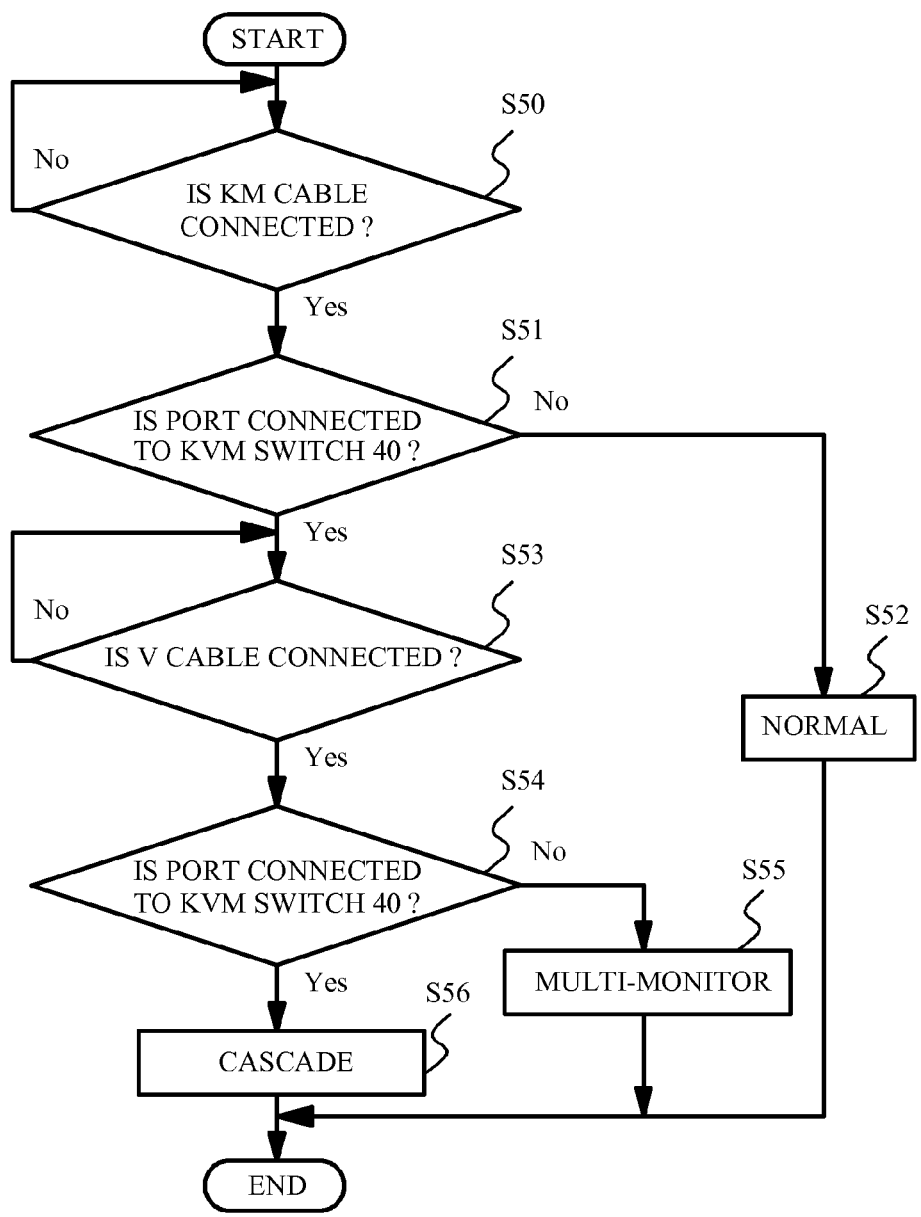
FIG. 14 is a flowchart illustrating automatic switching control of the KVM switch.

FIG. 14 is a flowchart illustrating automatic switching control of the KVM switch 50. As illustrated in FIG. 14, the mode switching unit 55 determines whether the KM cable 25 is connected to the port 54 (step S50). When the determination of step S50 is NO, step S50 is repeatedly performed. When the determination of step S50 is YES, the mode switching unit 55 determines whether the port 54 is connected to the KVM switch 40 via the KM cable 25 (step S51). When the determination of step S51 is NO, the mode switching unit 55 switches the current mode to the normal mode (step S52).

When the determination of step S51 is YES, the mode switching unit 55 determines whether the V cable 27 is connected to the port 54 (step S53). When the determination of step S53 is NO, step S53 is repeatedly performed. When the determination of step S53 is YES, the mode switching unit 55 determines whether the port 54 is connected to the KVM switch 40 via the V cable 27 (step S54). When the determination of step S54 is NO, the mode switching unit 55 switches the current mode to the multi-monitor mode (step S55). When the determination of step S54 is YES, the mode switching unit 55 determines that the port 54 is connected to the KVM switch 40 via the V cable 27. The mode switching unit 55 switches the current mode to the cascade connection mode (step S56). After steps S55 and S56, the automatic switching control is terminated.

Since the switching of the mode is automatically performed by the control illustrated in FIGS. 13 and 14, the convenience of the user is improved. When the KVM switch 50 performs the control of FIGS. 13 and 14 and the current mode is switched to the multi-monitor mode in both control of FIGS. 13 and 14 (steps S45 and S55), the KVM switch 50 functions as the KVM switch in the center of FIG. 5.

As the KM cable 25 and the V cable 27 connected between the KVM switches, an USB (Universal Serial Bus) cable or a PS/2 cable can be used, for example. Since a dedicated cable for connecting the KVM switches is not used and a commonly used cable can be used, the manufacturing cost of the KVM system can be reduced. The connection between the KVM switches and the connection between the KVM switch and the PCs may be achieved through a network, such as Internet or LAN (Local Area Network). Both of an analog KVM switch and a digital KVM switch can be used as the above-mentioned KVM switch. The input device 24 may include, for example, a touch panel, a microphone, or the like. An output device other than the monitor, such as a speaker or a projector, may be connected to the KVM switch.

The switches 47, 48, 57, 58, 67 and 68 may be switching circuits, and may be achieved by the MCUs 46, 56 and 66. That is, each of the MCUs 46, 56 and 66 may have a function to pass and interrupt the signal between the ports. A MCU may be provided for each port. For example, MCUs corresponding the respective ports 42a to 42d may be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A KVM (K: Keyboard, V: Video, M: Mouse) system, comprising:
   a first KVM switch; and
   a second KVM switch connected to the first KVM switch;
   the first KVM switch including:
      a plurality of first ports each of which is connectable to a computer or to the second KVM switch; and
      a second port connected to a first monitor and to an input unit for inputting an operation signal to operate the computer;
   wherein the first KVM switch selects one of the first ports to be connected to the second port, and the second KVM switch including:
- a plurality of third ports each of which is connectable to a computer; and
- a fourth port connected to one of the first ports, and to which a second monitor is connectable;

wherein the second KVM switch selects one of the third ports to be connected to the fourth port based on a control signal transmitted from the first KVM switch, wherein when the first port connected to the fourth port via a first cable is selected, the control signal is transmitted from the first KVM switch to the second KVM switch via the selected first port, the first cable and the fourth port, when the selected first port is connected to the fourth port via both of the first cable and a second cable, a video signal is transmitted from a computer connected to the selected third port to the first monitor through the fourth port, the second cable, the selected first port and the second port, and when the selected first port is connected to the fourth port via the first cable and is directly connected to the computer connected to the selected third port via the second cable, and the second monitor is connected to the fourth port, the video signal is transmitted from the computer to the first monitor through the second cable, the selected first port and the second port, and is also transmitted to the second monitor through the selected third port and the fourth port.

2. The KVM system as claimed in claim 1, wherein an operation signal for operating the computer is input to the second port, and when the one of the first ports connected to the fourth port is selected, the first KVM switch transmits the operation signal to the second KVM switch via the selected first port.

3. The KVM system as claimed in claim 1, wherein an image signal output from the same computer is input to the first port and the third port which are connected to the same computer.

4. The KVM system as claimed in claim 1, wherein a computer unconnected to the first port is connected to any one of the plurality of third ports, and the second KVM switch transmits an image signal output from the computer connected to the any one of the plurality of third ports, to the first KVM switch via the fourth port.

* * * * *